US009722765B2

(12) United States Patent
Sorbara et al.

(10) Patent No.: US 9,722,765 B2
(45) Date of Patent: Aug. 1, 2017

(54) METHOD AND APPARATUS FOR MANAGING PROCESSING IN TDD FRAMES TO ENABLE POWER DISSIPATION REDUCTION

(71) Applicant: IKANOS COMMUNICATIONS, INC., Fremont, CA (US)

(72) Inventors: Massimo Sorbara, Freehold, NJ (US); Julien Pons, Metuchen, NJ (US)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 250 days.

(21) Appl. No.: 14/515,894

(22) Filed: Oct. 16, 2014

(65) Prior Publication Data

US 2015/0109970 A1   Apr. 23, 2015

Related U.S. Application Data

(60) Provisional application No. 61/892,279, filed on Oct. 17, 2013.

(51) Int. Cl.
*H04M 19/08* (2006.01)
*H04L 5/14* (2006.01)

(52) U.S. Cl.
CPC ................... *H04L 5/1469* (2013.01)

(58) Field of Classification Search
CPC .................................................. H04M 19/08
See application file for complete search history.

(56) References Cited

U.S. PATENT DOCUMENTS

| 5,732,076 A * | 3/1998 | Ketseoglou ......... H04B 7/2656 |
| | | 370/280 |
| 6,611,755 B1 * | 8/2003 | Coffee .................... B28C 5/422 |
| | | 340/438 |
| 6,778,557 B1 * | 8/2004 | Yuki ................... H04L 12/1877 |
| | | 370/230 |

(Continued)

FOREIGN PATENT DOCUMENTS

WO   WO-2014164854 A1   10/2014

OTHER PUBLICATIONS

International Search Report and Written Opinion for International PCT Patent Application No. PCT/US2014/061082 mailed Jan. 15, 2015.

(Continued)

*Primary Examiner* — Robert M Morlan
*Assistant Examiner* — Nourali Mansoury
(74) *Attorney, Agent, or Firm* — Holland & Hart LLP/Qualcomm (57) ABSTRACT

The present invention relates to methods and apparatuses for managing the time slots in time division duplex (TDD) frames in an xDSL system. According to certain aspects, power savings in a TDD system operating with vectoring may be achieved with sending of quiet symbols in time slots that do not have data and through the efficient configuration of time slots with data and/or idle symbols so as to limit the amount of processing by the vectoring engine within the DO portion of each TDD frame. In embodiments, a central controller in a DPU monitors the data buffers at the transmitter input on each line and computes an optimal configuration of the time slots in the DO portion of the TDD frame to achieve an optimal balance between performance and power dissipation.

12 Claims, 7 Drawing Sheets

(56) References Cited

U.S. PATENT DOCUMENTS

| | | | |
|---|---|---|---|
| 7,304,972 B2* | 12/2007 | Cain | H04B 7/0491 370/252 |
| 7,333,458 B2* | 2/2008 | Cain | H04B 7/0491 370/337 |
| 2003/0086362 A1 | 5/2003 | Hasegawa et al. | |
| 2004/0235506 A1* | 11/2004 | Roettger | H04B 7/155 455/502 |
| 2005/0207482 A1 | 9/2005 | Redfern | |
| 2007/0242600 A1* | 10/2007 | Li | H04L 5/0007 370/210 |
| 2009/0245340 A1 | 10/2009 | Sorbara et al. | |
| 2009/0290572 A1* | 11/2009 | Gonia | H04J 3/0641 370/350 |
| 2010/0195478 A1 | 8/2010 | Schenk et al. | |
| 2012/0106471 A1* | 5/2012 | Behravan | H04L 5/005 370/329 |
| 2013/0215935 A1 | 8/2013 | Nuzman et al. | |
| 2013/0272177 A1* | 10/2013 | Wei | H04M 11/062 370/294 |
| 2015/0215059 A1* | 7/2015 | Kerpez | H04M 11/062 379/406.01 |

OTHER PUBLICATIONS

Associate Rapporteur for G. fast, "Updated draft text for G.fast—version 8," ITU-T Contribution 2013-10-Q4-R20,Oct. 28-31, 2013, Ipswich, United Kingdom.

G.fast Editor, "G.fast: Updated Issues List for G.fast," ITU-T Q4/15 Contribution 2013-09-Q4-U20R3c1, Sep. 30-Oct. 4, 2013, Barcelona, Spain.

Lantiq, Sckipio, "G.fast: Functionality to facilitate discontinuous operation," ITU-T Q4/15 Contribution 2013-09-Q4-046, Sep. 30-Oct. 4, 2013, Barcelona, Spain.

Alcatel-Lucent, "G.fast: definitions related to discontinuous operation" ITU-T Q4/15 Contribution 2013-09-Q4-026, Sep. 30-Oct. 4, 2013, Barcelona Spain.

Alcatel-Lucent, "G.fast: Energy Efficiency—performance trade-offs," ITU-T SG15 Contribution C-0405, Jul. 1-12, 2013, Geneva, Switzerland.

Skipio, "G.fast: Proposal for discontinuous operation," ITU-T SG15 Contribution C-0307, Jul. 1-12, 2013, Geneva, Switzerland.

Metonia, G.fast. SNR Loss in Discontinuous Operation, ITU-T SG15 Contribution C-0172, Jul. 1-12, 2013, Geneva, Switzerland.

Lantiq, "G.fast: Additional functionality associated with discontinuous operation," ITU-T Q4/15 Contribution 2013-05-Q4-058, May 13-17, 2013, Hoffman Estates, IL.

Lantiq, "G.fast: Issues with discontinuous operation," ITU-T Q4/15 Contribution 2013-05-Q4-057, May 13-17, 2013, Hoffman Estates, IL.

Ikanos, "G.fast: Timing Recovery Issues for G.fast Operation in Low Power Modes," ITU-T Q4/15 Contribution 2013-05-Q4-066, May 13-17, 2013, Hoffman Estates, IL.

Futurewei, "G.fast: Stability Issue Due to Discontinuous Operations," ITU-T Q4/15 Contribution 2013-05-Q4-054, May 13-17, 2013, Hoffman Estates, IL.

Alcatel-Lucent,"G.fast: Solutions for Precoding in Discontinuous Operations," ITU-T Q4/15 Contribution 2013-03-04-052, Mar. 18-22, 2013, Red Bank, NJ.

Lantiq, "G.fast: Precoder update in support of discontinuous operation," ITU-T Q4/15 Contribution 2013-01-Q4-068, Jan. 28-Feb. 1, 2013, Geneva, Switzerland.

Sckipio, "G.fast: Power saving implications on vectoring—static allocation case," ITU-T Q4/15 Contribution 2012-11-Q4a-043, Nov. 5-9, 2012, Chengdu, China.

ITU-T Recommendation G.993.5, "Self-FEXT cancellation (vectoring) for use with VDSL2 transceivers," Apr. 2010.

Humphrey et al. (BT plc), "G.fast: Low Power Modes—Continued," ITU—Telecommunication Standardization Sector, Study Group 15, Study Period 2013-2016, May 10, 2013, 8 pgs, TD 2013-03-Q4-067, vol. 4a/15, XP017580484, International Telecommunication Union, Geneva, CH [retrieved on May 10, 2013].

Wei et al. (Huawei Technologies), "G.fast: Discontinuous Mode Power Saving," ITU—Telecommunication Standardization Sector, Study Group 15, Study Period 2009-2012, Oct. 12, 2012, 7 pgs, TD 2012-05-4A-030, vol. 4a/15, XP044111439, International Telecommunication Union, Geneva, CH [retrieved on Oct. 12, 2012].

Oksman et al. (Lantiq/Sckipio), "G.fast: Functionality to Facilitate Discontinuous Operation," ITU—Telecommunication Standardization Sector, Study Group 15, Study Period 2013-2016, Sep. 24, 2013, 11 pgs, TD 2013-09-Q4-046, vol. 4/15, XP044115674, International Telecommunication Union, Geneva, CH [retrieved on Sep. 24, 2013].

EPO, Supplementary European Search Report, EP App. No. 14854543.6, May 10, 2017, European Patent Office, Munich, DE, 10 pgs.

* cited by examiner

METHOD AND APPARATUS FOR MANAGING PROCESSING IN TDD FRAMES TO ENABLE POWER DISSIPATION REDUCTION

CROSS REFERENCE TO RELATED APPLICATIONS

The present application claims the benefit under 35 USC 119(e) of prior co-pending U.S. Provisional Patent Application No. 61/892,279, filed Oct. 17, 2013, the disclosure of which is hereby incorporated by reference in its entirety.

FIELD OF THE INVENTION

The present invention relates to data communications, and in particularly to methods and apparatuses to enable power dissipation reduction in a time division duplexed (TDD) xDSL system using vectoring.

BACKGROUND OF THE RELATED ART

In 2011, the ITU-T officially began a project to define advanced high speed transmission on twisted pair cables to address high speed transmission on short loop lengths (<250 m) at speeds up to approximately 1 Gb/s aggregate (sum of upstream and downstream rates). The result of this study is ITU-T Recommendation G.9701 (i.e. the G.fast Recommendation or G.fast), which defines a transceiver specification based on time division duplexing (TDD) for the transmission of the downstream and upstream signals in a wide bandwidth of approximately 106 MHz and a symbol rate of approximately 48 kHz. This contrasts with prior standards such as VDSL2 having a 17.6 MHz bandwidth with a corresponding symbol rates of approximately 4 kHz and 30 MHz bandwidth with a corresponding symbol rate of 8 kHz.

In an effort to obtain power savings in a distribution point unit (DPU) with an option to operate with reverse power feed from the customer premises equipment (CPE), G.fast defines a scheme called discontinuous operation (DO). This allows transceivers on each link to "turn off" system processing to help scale the system power dissipation commensurate with the amount of data traffic being passed. By transmitting data in time slots when data is available and transmitting silence when there is no data available, the equipment power dissipation may be scaled directly with the available user payload data.

What is needed is an approach for managing DO in a G.fast or other TDD system that addresses various issues that are not contemplated or addressed by G.fast itself.

SUMMARY OF THE INVENTION

The present invention relates to methods and apparatuses for managing the time slots in time division duplex (TDD) frames in an xDSL system. According to certain aspects, power savings in a TDD system operating with vectoring may be achieved with sending of quiet symbols in time slots that do not have data available and through the efficient configuration of time slots with data and/or idle symbols so as to limit the amount of processing by the vectoring engine within the DO portion of each TDD frame. In embodiments, a central controller in a DPU monitors the data buffers at the transmitter input on each line and computes an optimal configuration of the time slots in the DO portion of the TDD frame to achieve an optimal balance between performance and power dissipation.

In furtherance of these and other aspects, a method for managing time slots for two or more lines in a time division duplex (TDD) frame includes configuring a number of time slots for a normal operation portion of the TDD frame for all of the two or more lines, configuring a first number of time slots for quiet symbols and a second number of time slots for data symbols in the TDD frame after the normal operation portion for a first one of the two or more lines, and configuring a third number of time slots for quiet symbols and a fourth number of time slots for data symbols in the TDD frame after the normal operation portion for a second one of the two or more lines, wherein one or both of the first and second numbers are different than the third and fourth numbers, respectively.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting;

rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Notably, the terminology used in the present specification is driven by preferred embodiments based on the G.fast (G.9701) Recommendation. However, the present invention is not limited to such embodiments, and the concepts of the invention are applicable to any time division duplexed multicarrier based system other than G.fast.

According to certain aspects, the present inventors recognize that when a line in a vectored group turns off its transmitter to implement DO, but keeps bias power to the transceiver so as to preserve the termination impedance on channel, the crosstalk cancellation matrix is no longer matched to the crosstalk channel matrix of the cable. So, if the cancellation matrix is not properly updated, crosstalk in the cable may no longer be fully cancelled, and performance may be adversely affected depending on the specific crosstalk channel characteristics.

According to certain additional aspects, therefore, embodiments of the invention relate to a protocol for managing the symbol time slots in time division duplex (TDD) frames during DO when the DPU has vectoring enabled so that the crosstalk channel matrix of the cable can be managed efficiently, thereby maintaining system performance.

Embodiments of the invention will be described primarily in connection with the downstream operation where the equipment in the distribution point unit (DPU) is all centrally located and the transceivers may be controlled by a central processor in the DPU. The customer premises transceivers are all distributed to different (disparate) locations. Since upstream crosstalk cancellation is done with post cancellation processing in the DPU, discontinuous operation on each line may be rendered autonomous. However, the invention is not limited to downstream operations, and the principles described herein for the downstream may also be applied to the upstream channel using coordinated upstream flow control, for example.

Figure 1:
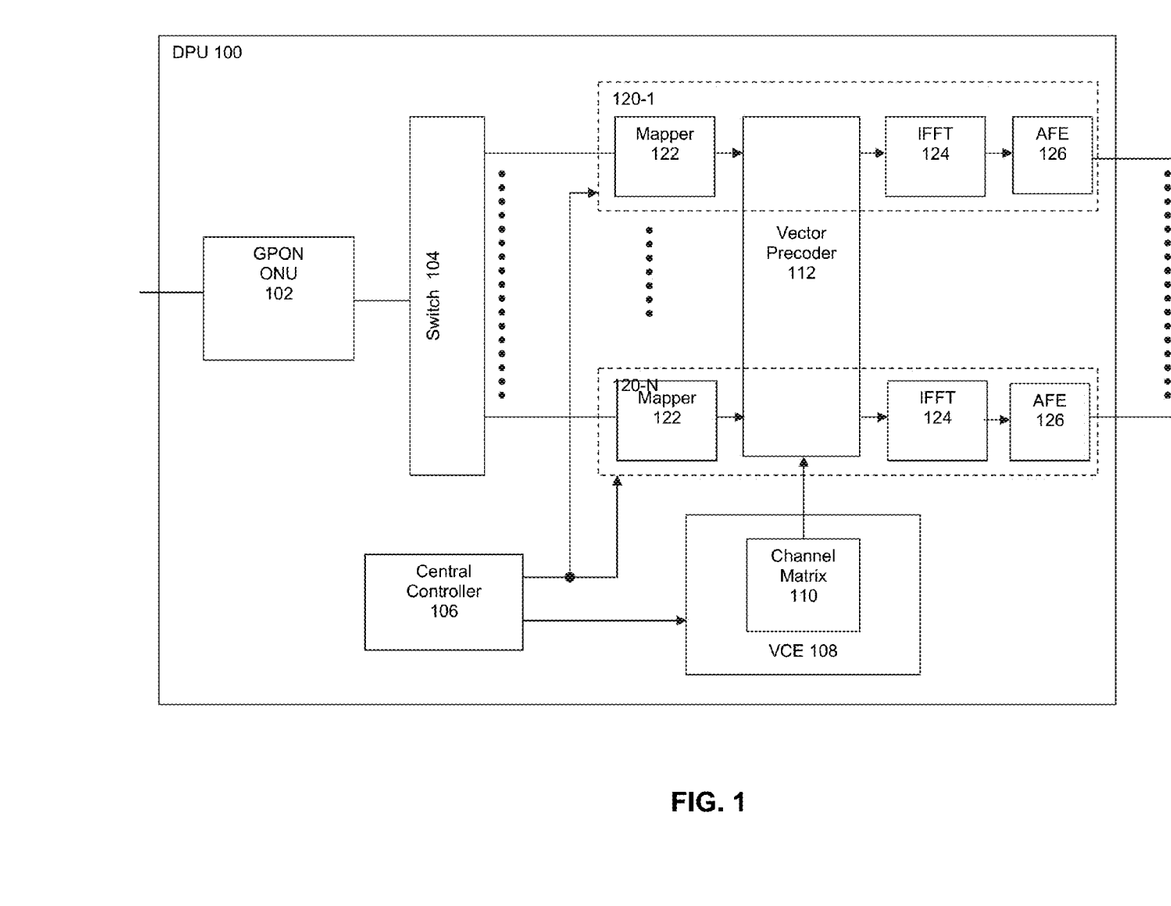
FIG. 1 is a block diagram of an example Distribution Point Unit (DPU) according to embodiments of the invention.

A block diagram illustrating an example DPU 100 for implementing aspects of the present invention is shown in FIG. 1. As shown, DPU 100 includes a fiber optic transceiver (GPON ONU) 102, a switch 104, a central controller 106, a vector control entity (VCE) 108 which maintains a channel matrix 110, a vector precoder 112 and N G.fast transceivers 120-1 to 120-N.

As is known, during downstream TDD frames, transceivers 120-$j$ (where j=1, 2, . . . , N) map user data received from GPON ONU 102 and switch 104 to frequency domain symbols using mapper 122 (for each line supported by the DPU). To perform vectoring, vector precoder 112 adjusts the symbols before they are converted to time domain by IFFT 124 and analog signals by AFE 126. Vector precoder 112 uses channel matrix 110 whose contents are controlled by VCE 108 based on channel characteristics (i.e. FEXT coefficients) learned by processing of reported error samples or receiver FFT output sample relative known pilot sequences. Assuming all N lines are active and part of the vectored group, channel matrix 110 is an N×N matrix for each tone, and precoder 112 performs full N×N vectoring on all N lines.

According to certain aspects, the key elements of FIG. 1 to consider are the G.fast transceivers 120 and the vector precoder 112. The power dissipation of these blocks will be most affected by the discontinuous operation being applied on the transceivers. An aspect of the invention is to scale the power dissipation of the transceivers 120 and vectoring precoder 112 commensurate with the amount of actual user data transmitted in each frame by a vectored group of transceivers 120.

It should be noted that FIG. 1 illustrates components for downstream transmissions for ease of illustrating aspects of the invention. However, DPU 100 typically also includes components for facilitating upstream communications, as should be apparent to those skilled in the art. Similarly, transceivers 120 are illustrated as including downstream path components such as mapper 122, IFFT 124 and AFE 126 for ease in illustrating certain aspects of the invention as set forth in more detail below. However, it should be understood that transceivers 120 can include additional components not shown in FIG. 1, including components for facilitating both upstream and downstream communications.

Central controller 106, VCE 108, vector precoder 112 can be implemented by processors, chipsets, firmware, software, etc. such as NodeScale Vectoring products provided by Ikanos Communications, Inc. Those skilled in the art will be able to understand how to adapt these and other similar commercially available products after being taught by the present examples.

Meanwhile, G.fast transceivers 120 include conventional processors, chipsets, firmware, software, etc. that implement communication services such as those defined by the G.fast Recommendation, as adapted for use in the present invention. Those skilled in the art will be able to understand how to adapt such conventional G.fast products after being taught by the present examples.

It should be noted that, although shown separately for ease of illustration, some or all of components 106, 108, 110, 112 and 120 may be incorporated into the same chips or chipsets.

It should be further noted that, although not illustrated here, transceivers 120 communicate with CPE transceivers also including conventional processors, chipsets, firmware, software, etc. that implement communication services such as those defined by the G.fast Recommendation, as adapted for use in the present invention. Those skilled in the art will be able to understand how to adapt such G.fast products after being taught by the present examples.

Figure 2:
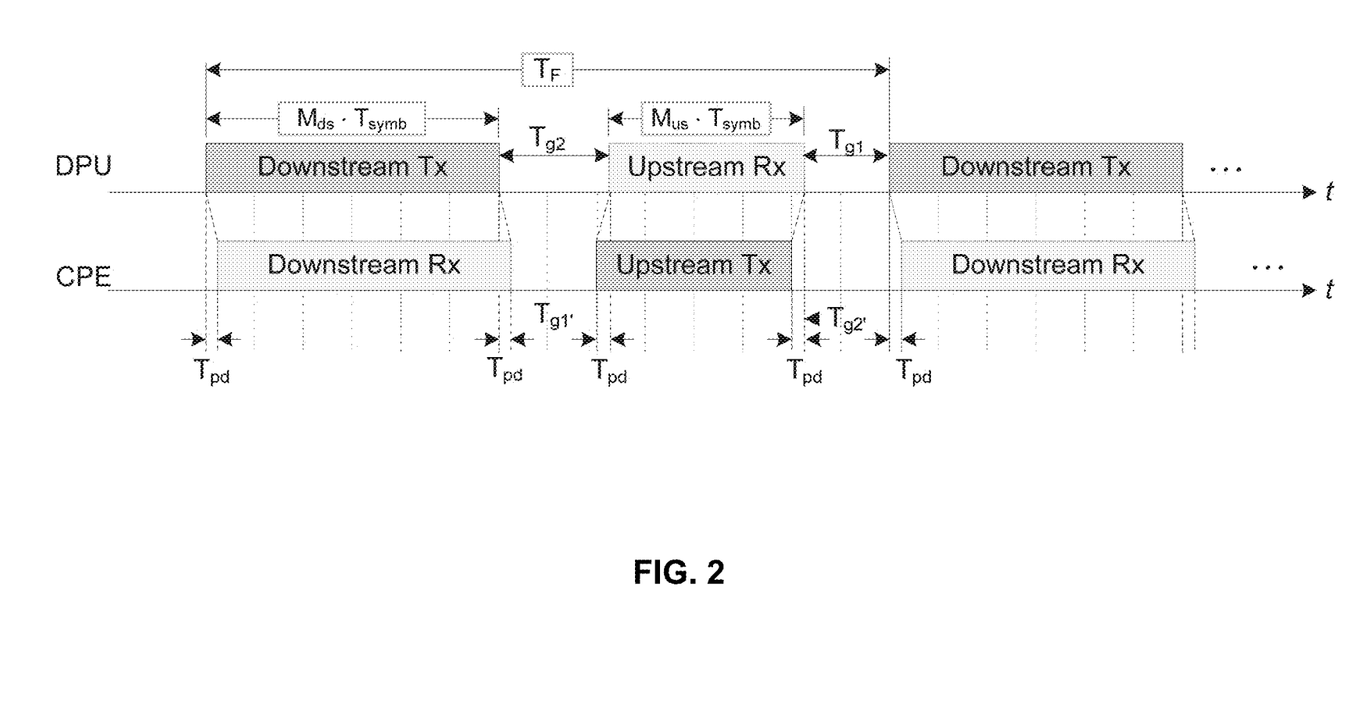
FIG. 2 illustrates an example G.fast Time Division Duplexing (TDD) Frame Structure and timing diagram.

FIG. 2 shows a timing diagram for the format of the time division duplexing (TDD) frame in reference. Downstream transmission (from DPU to the CPE) on a single link is provided from the transmitter in the time intervals identified by "Downstream Tx;" upstream transmission (from CPE to the DPU) is provided during the time intervals identified by "Upstream Tx." Downstream reception by the CPE receiver is done during the interval "Downstream Rx" and that for the DPU receiver is done during the interval "Upstream Rx." Gap times (Tgx) are defined to allow the transceiver to reconfigure between transmit and receive functionality and vice versa.

When vectoring is applied, the TDD frames of each line are all aligned with each other so as to facilitate proper crosstalk cancellation among all the lines in the vector group.

When transmitting data at the full rate, all of the time slots in the downstream and upstream transmission intervals are filled with end user data. However, DO allows transceivers 120 to transmit "Quiet symbols" in a time slot where no end user data is available. A Quiet symbol does not actually involve the formation of any symbols by transceiver 120 nor any transmission of energy on the line. Rather, the transceiver is merely biased in such a manner as to maintain the same termination impedance it has on the line when it is transmitting data. Transmission of a quiet symbol effectively turns off the process of the transceiver for the symbol period resulting in power savings relative to the case where the transceiver is sending a data symbol.

Figure 3:
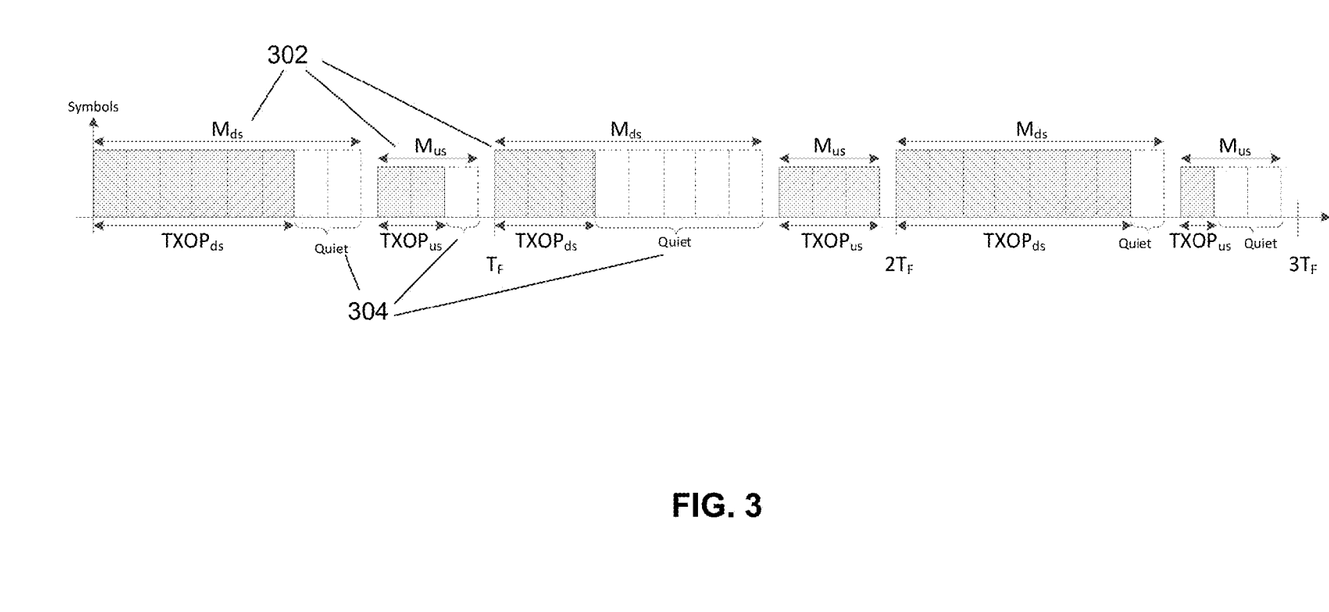
FIG. 3 is a diagram illustrating an example of how discontinuous operation can be implemented on a single link served by a single line DPU (no vectoring)

FIG. 3 provides an example of DO being performed in both downstream and upstream communications on a single line. In the figure, the shaded time slots 302 represent periods of active data transmission where both the downstream and upstream transceivers are processing data and sending energy on the line; the non-shaded slots 304 represent periods of transmitting Quiet symbols where transceiver processing is turned off. According to certain aspects, the power dissipation of the transceivers 120 during the Quiet intervals (no transceiver processing) 304 is significantly less than during periods of active data transmission intervals 302 (full transceiver processing).

Figure 4:
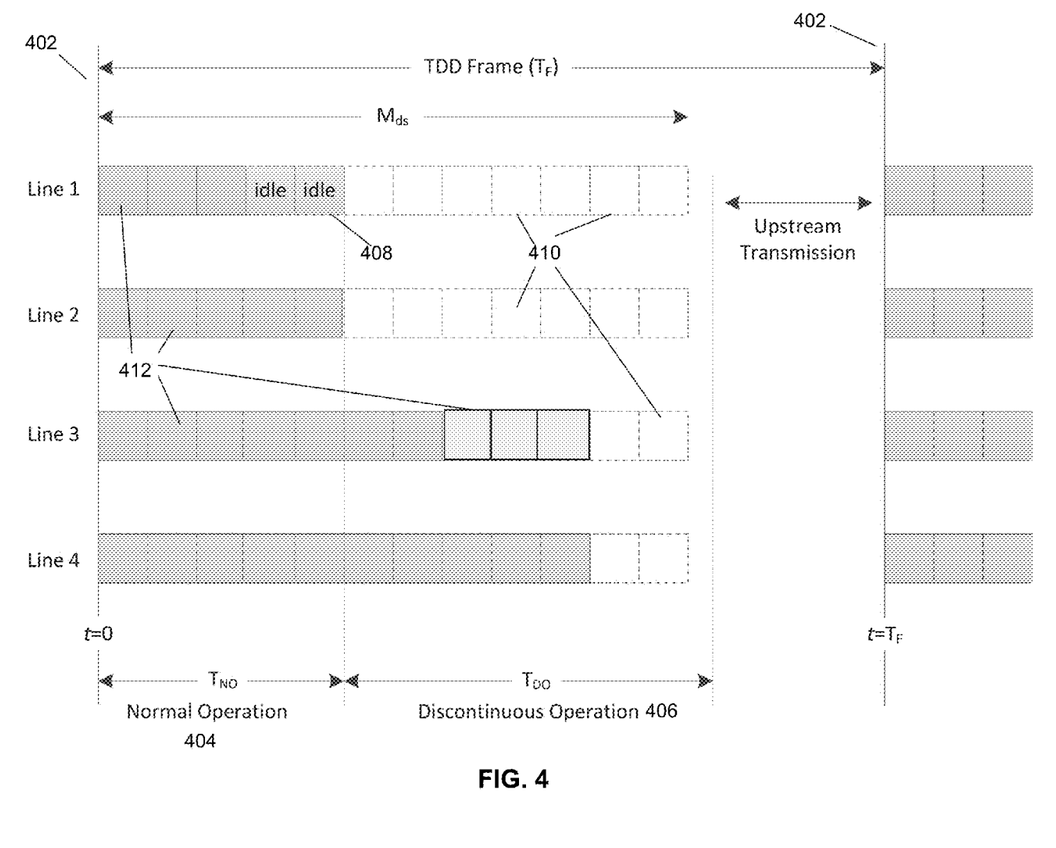
FIG. 4 is a diagram illustrating an example discontinuous operation with vectoring of four lines.

FIG. 4 shows an example of DO being performed when vectoring is enabled in a DPU supporting four lines (i.e. N=4). As shown in this example, to enable vectoring, the TDD frame boundaries 402 are all aligned on all the lines in the vector group. FIG. 4 shows two time regions: one designated as "Normal Operation" 404 where all of the lines in the vector group are transmitting data 412 or idle symbols 408 in each of the time slots; the other region, designated as "Discontinuous Operation" 406 has a mixture of time slots transmitting data 412, idle symbols 408 or quiet symbols 410.

It should be noted that, as mentioned previously, embodiments of the invention focus on transmission in the downstream direction. The crosstalk cancellation in the upstream direction is done with post cancellation processing in the upstream receiver. However, the principles described here for the downstream may also be applied to the upstream channel using coordinated upstream flow control, and so the invention includes such upstream embodiments as well.

In FIG. 4, slots 412 represent transmission of end user data. The idle symbol 408 is constructed using the (0,0) point of the direct channel constellation. No user data is transmitted on the line during time slots corresponding to symbols 408 but sending such an idle symbol effectively causes the transceiver 120 to send crosstalk cancellation signal energy from other lines in the vector group to provide downstream crosstalk cancellation. It should be noted that idle symbols 408 therefore differ from quiet symbols 410 in that the idle symbols 408 are actually adjusted by vector precoder 112 and converted to time domain signals by IFFT 124 for transmission on the associated lines, whereas quiet symbols 410 do not result in any signals actually being transmitted.

In the example of FIG. 4, to enable vectoring, during Normal Operation 404, the VCE 108 operates with full 4×4 pre-coding for downstream crosstalk cancellation. Thus, the system is operating with full throughput maximum performance, while also dissipating the maximum power dissipation. Note in this example that the central controller 106 has assigned two slots in line 1 for the corresponding transceiver 120 to transmit idle symbols 408, so as to preserve full crosstalk cancellation and preserve full vectoring performance during period 404.

For the discontinuous operation region 406, the central controller 106 optimally configures the time slots for proper balance between system performance and power dissipation savings. Accordingly, in this example, the central controller 106 causes the VCE 108 to reconfigure the channel matrix 110 so that the downstream pre-coder 112 uses a 2×2 configuration for cancelling the crosstalk between lines 3 and 4, while configuring the transceivers 120 for lines 1 and 2 to transmit only quiet symbols. To preserve the performance of the reconfigured 2×2 pre-coder, the central controller 106 further configures the transceiver 120 for lines 3 and 4 to transmit data symbols 412 in the first five slots in the DO interval where the 2×2 pre-coder is active. Since there was not enough data on line 4 to fill the entire TDD frame, transceivers 120 of lines 3 and 4 are configured to send quiet symbols 410 in the last two slots. For the 2×2 pre-coder configuration, it can be assumed that some power saving is achieved in the precoder 112 as compared with the full 4×4 configuration for the corresponding period of time since fewer operations were executed. The time intervals where all of the lines transmit quiet exhibit power savings from each of the transceivers 120 and the vector precoder 112.

It should be noted that, when linear pre-coding is used for downstream crosstalk cancellation, transceivers 120 may need to adjust the transmit signal power spectral density (PSD) on each line each time the pre-coder matrix 110 is adjusted. Also, the frequency domain equalizer (FEQ) in each transceiver 120 and possibly the bit loading table used by mappers 122 need to be adjusted commensurate to the changes in the pre-coder matrix 110. Note that compensation for the FEQ settings may be accommodated directly in the updated pre-coder matrix 110. Moreover, adjustments to the bit loading table in transceivers 120 need to be communicated to the CPE transceivers via a management channel in the downstream direction. Those skilled in the art understand how to make such PSD, FEQ and bit loading adjustments in conjunction with changes to the pre-coder matrix 110, and so further details thereof will be omitted here for sake of clarity of the invention.

It should be further noted that the configuration of the channel matrix 110 and pre-coder 112, as well as the number of time slots in the discontinuous operation region 406 is dependent on the amount of data required for transmission during the TDD frame. The central controller 106 monitors the activity on the transmit buffers in transceivers 120 to help determine the configuration of time slots and the pre-coder. The algorithms used by controller 106 to determine the optimal balance between performance and power dissipation savings can be implementation dependent, and those skilled in the art will be able to implement various such algorithms after being taught by the present examples.

FIG. 4 illustrates an example where the transceivers for all lines having user data to transmit during the NO interval while only lines 3 and 4 have data to transmit in the DO interval 406.

Figure 5:
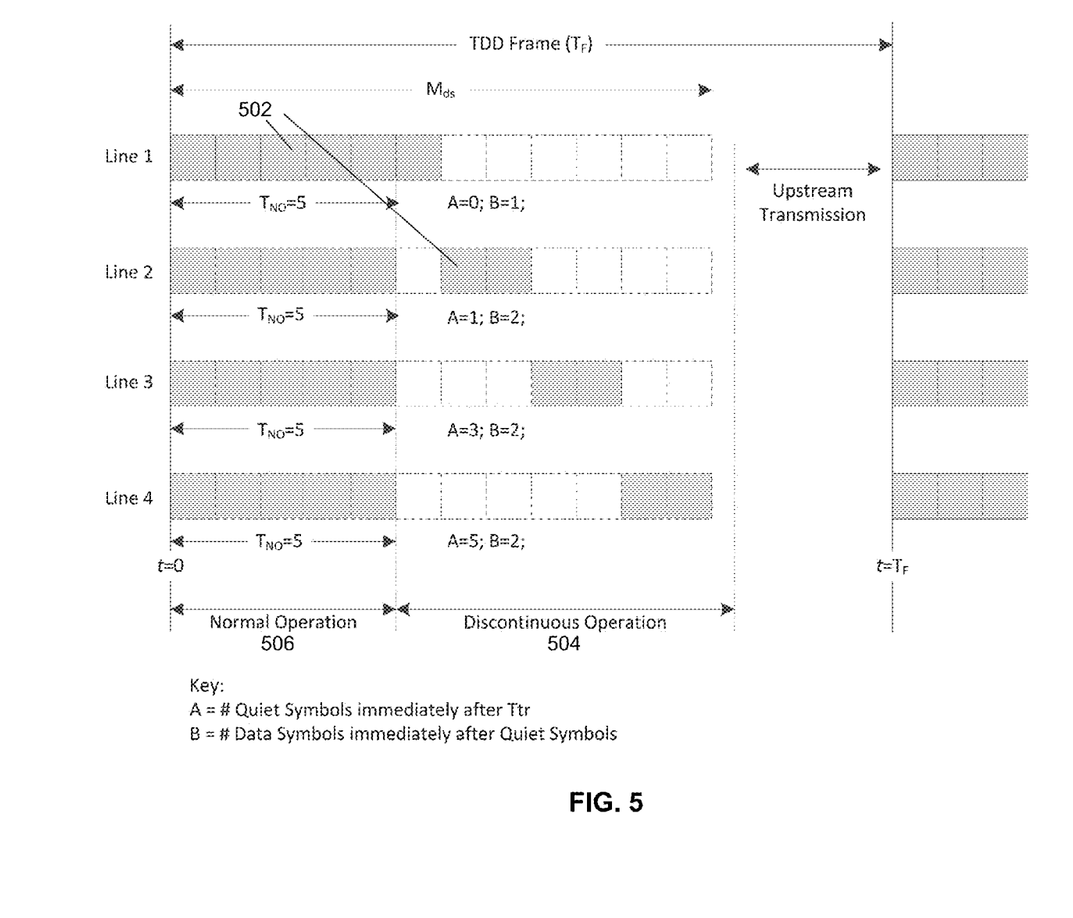
FIG. 5 is a diagram illustrating an example implementation of crosstalk avoidance in the discontinuous operation region according to embodiments of the invention.

The example in FIG. 5 shows a situation enabled by embodiments of the invention where the traffic demand in a specific TDD frame allows for the distribution of the data symbols across the available time slots during DO interval in such a way that only one line at a time in the vector group is actively transmitting data symbols 502 and the remaining lines are all quiet. The advantage of this scenario is that the vector precoder 112 may be turned off during the entire discontinuous operation interval 504, giving maximum power savings with respect to the crosstalk cancellation processing. In the normal operation region ($T_{NO}$) 506 the precoder 112 is operating with the full 4×4 pre-coder matrix 110 in this example.

For this configuration to take place in a given TDD frame, the central controller 106 communicates the following items to each of the transceivers 120 prior to the beginning of the TDD frame:

The number of time slots for Normal Operation ($T_{NO}$) interval 506.

Note that the value of $T_{NO}$ may be different in each TDD frame.

The number of quiet symbols (A) at the beginning of the discontinuous operation period 504. Note that this value may be zero.

The number of data and/or idle symbols (B) immediately following the quiet symbols. Note that if both A and B have the value zero, then all the slots in the discontinuous operation interval transmit quiet symbols.

The updates (compressed format) to the bit loading table for use during the discontinuous operation period.

These parameters are further communicated to CPE transceivers using the conventional Robust Management Channel (RMC), for example, as defined in the draft G.9701 Recommendation. Those skilled in the art will be able to understand how to adapt conventional G.fast signaling and configuration to accommodate these additional parameters per the present specification.

Moreover, central controller 106 configures the VCE 108 to update the pre-coder matrix 110 commensurate with the time slot configuration in the frame.

It should be noted that there can be many ways that DO time slots can be configured by embodiments of the invention. For example, as set forth above and described herein, central controller 106 can closely monitor the transmit buffers of transceivers 120 and configure the DO (i.e. unique values for parameters $T_{NO}$, A and B) each downstream frame by frame. In other examples, central controller 106 can configure the DO once for a time span of many frames until certain conditions change, such as when a threshold amount of aggregate increase or decrease of user data in the transmit buffers of transceivers 120. In other examples, algorithms can be used by central controller 106 to pre-determine certain time periods where different DO configurations should be applied, and communicate these different time periods and corresponding parameters to transceivers 120.

Likewise, there can be many ways that VCE 108 can configure pre-coder matrix 110 for DO by embodiments of the invention. In some examples, VCE 108 can dynamically re-compute matrix 110 in accordance with the identification and number of lines to be vectored in different DO time slots as communicated by central controller 106. This can be done based on initial channel characteristics as learned in the conventional manner. In other examples, VCE 108 can pre-compute and store different sets of values for matrix 110 depending on different likely scenarios and swap them in and out based on new configurations of the DO communicated by central controller 106. This can be as simple as having one full-performance set of values of matrix 110 for normal operation and one other set of values of matrix 110 for all DO configurations.

Figure 6:
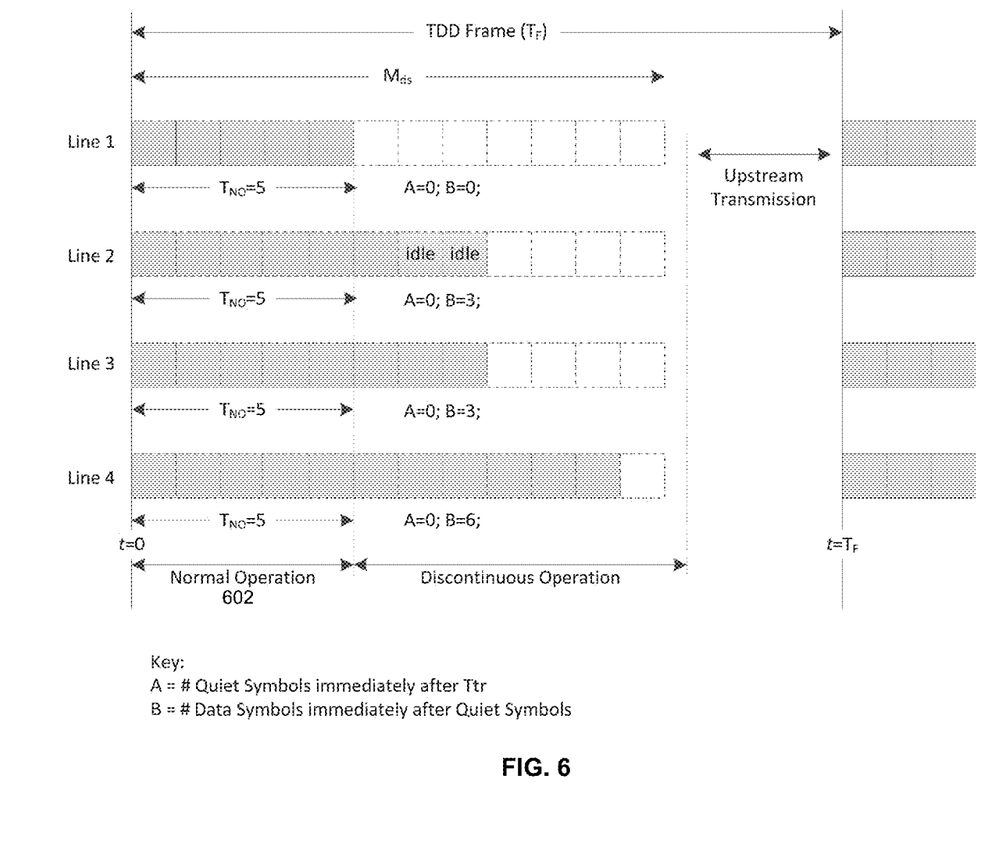
FIG. 6 is a diagram illustrating another example showing DO interval (i.e. $T_{NO}$, A, and B parameter) configurations with gradual decrease in vector group sizes with increasing the DO Interval according to aspects of the invention.

FIG. 6 shows another example configuration of the time slots in the TDD frame according to embodiments of the invention, where the size of vector group is reduced in the discontinuous operations interval compared to that in the normal operation interval. The parameters of $T_{NO}$, A, and B are communicated from the central controller 106 to the transceivers 120 on each line in the vector group prior to the TDD frame in reference or immediately at the beginning of the TDD frame. These parameters are further communicated to CPE transceivers using the defined Robust Management Channel (RMC), for example.

In this example, the normal operation region 602, $T_{NO}=5$ indicates that the first five slots of the TDD frame operate with the full 4×4 pre-coder. Upon entering the discontinuous operation region 604, the central controller 106 causes VCE 108 to reconfigure the pre-coder matrix 110 and precoder 112 for 3×3 crosstalk cancellations on lines 2, 3, and 4 for the first three time slots; afterwards the central controller 106 turns off the vectoring engine and line 4 operates solely without vectoring for 3 symbols. The remainder of the frame uses only quiet time slots.

Figure 7:
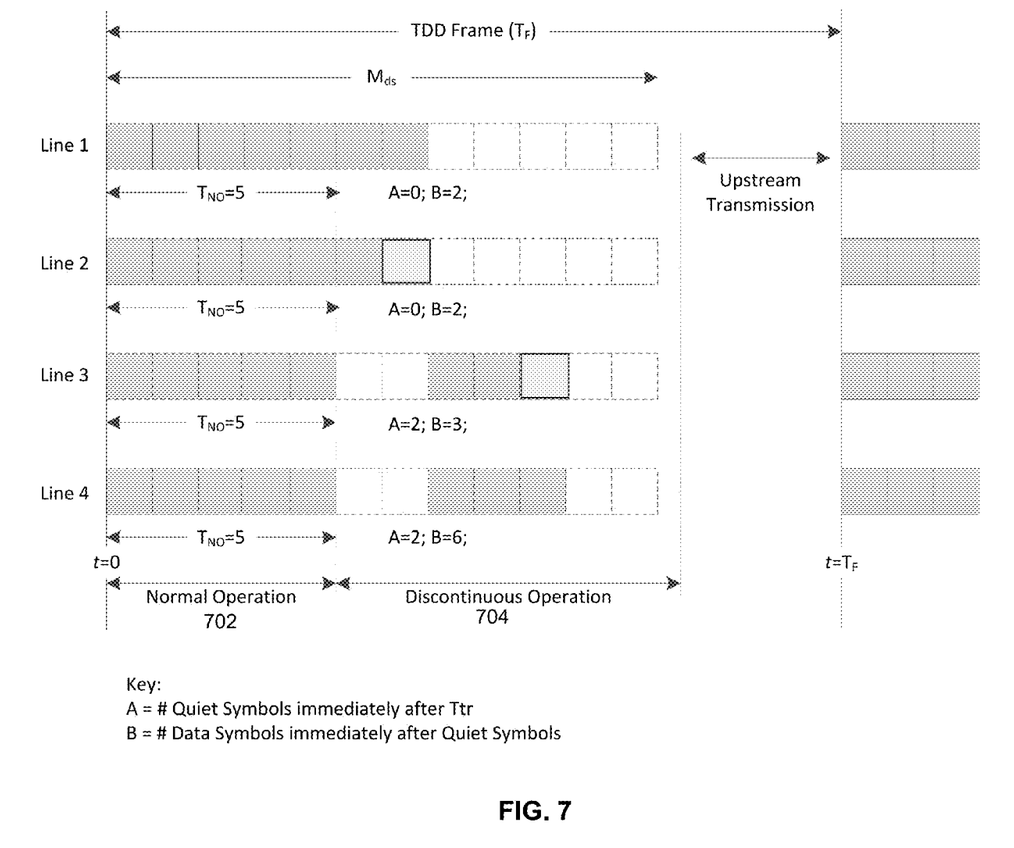
FIG. 7 is a diagram illustrating another example of how DO can be configured with multiple smaller cancellation matrices according to aspects of the invention.

FIG. 7 shows a further example configuration of the time slots in the TDD frame according to embodiments of the invention. In this example, matrix 110 can be reduced from a 4×4 configuration to two different 2×2 configurations during the discontinuous operation interval 704. The parameters of $T_{NO}$, A, and B are communicated from central controller 106 to transceivers 120 on each line in the vector group prior to the TDD frame in reference or immediately at the beginning of the TDD frame in reference. These parameters are further communicated to CPE transceivers using the conventional Robust Management Channel (RMC), for example.

In this example, upon entering the discontinuous operation region 704, the central controller 106 causes the VCE 108 to reconfigures the pre-coder matrix 110 and precoder 112 for 2×2 crosstalk cancellations on lines 1 and 2 for the first two slots; afterwards the central controller 106 causes the VCE 108 to turn off vectoring for lines 1 and 2 and reconfigure the pre-coder matrix 110 and precoder 112 for 2×2 cancellations on lines 3 and 4 for the next three time slots. The remainder of the frame uses only quiet time slots. Hence a full 4×4 crosstalk cancellation operation was reduced to two 2×2 crosstalk cancellation operations, which significantly reduces the total number of operations saving power dissipation in the vector cancellation block.

Although the present invention has been described in detail above with reference to the drawings, these are provided as illustrative examples of the invention so as to enable those skilled in the art to practice the invention. Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

What is claimed is:

1. A method for managing time slots for two or more lines in a time division duplex (TDD) frame, comprising:
configuring a number of time slots for a normal operation portion of the TDD frame for all of the two or more lines;
configuring a first number of time slots for quiet symbols and a second number of time slots for data symbols in the TDD frame after the normal operation portion for a first one of the two or more lines;
configuring a third number of time slots for quiet symbols and a fourth number of time slots for data symbols in the TDD frame after the normal operation portion for a second one of the two or more lines, wherein one or both of the first and second numbers are different than the third and fourth numbers, respectively; and
sending the number of time slots, the first number of time slots for quiet symbols, the second number of time slots for data symbols, the third number of time slots for quiet symbols, and the fourth number of time slots for data symbols to transceivers associated with the two or more lines in a distribution point unit (DPU).

2. The method according to claim 1, further comprising performing vectoring of all of the two or more lines during the normal operation portion of the TDD frame.

3. The method according to claim 2, further comprising performing vectoring of only certain of the two or more lines after the normal operation portion of the TDD frame in accordance with the configuring of the first number of time slots for quiet symbols, the second number of time slots for data symbols, the third number of time slots for quiet symbols, and the fourth number of time slots for data symbols.

4. The method according to claim 1, further comprising sending the number and the first, second, third and fourth numbers of time slots, the first number of time slots for quiet symbols, the second number of time slots for data symbols, the third number of time slots for quiet symbols, and the fourth number of time slots for data symbols to downstream transceivers coupled to the two or more lines.

5. The method according to claim 1, wherein the DPU transceivers and the downstream transceivers implement TDD communications according to G. fast.

6. The method according to claim 5, wherein sending the number of time slots, the first number of time slots for quiet symbols, the second number of time slots for data symbols, the third number of time slots for quiet symbols, and the fourth number of time slots for data symbols to downstream transceivers includes using a Robust Management Channel (RMC) specified by G.fast.

7. A system for managing time slots for two or more lines in a time division duplex (TDD) frame, comprising:
a central controller comprising one or more processors configured to execute instructions to perform operations comprising:
configuring a number of time slots for a normal operation portion of the TDD frame for all of the two or more lines;
configuring a first number of time slots for quiet symbols and a second number of time slots for data symbols in the TDD frame after the normal operation portion for a first one of the two or more lines;
configuring a third number of time slots for quiet symbols and a fourth number of time slots for data symbols in the TDD frame after the normal operation portion for a second one of the two or more lines, wherein one or both of the first and second numbers are different than the third and fourth numbers, respectively; and
sending the number of time slots, the first number of time slots for quiet symbols, the second number of time slots for data symbols, the third number of time slots for quiet symbols, and the fourth number of time slots for data symbols to transceivers associated with the two or more lines in a distribution point unit (DPU).

8. The system according to claim 7, further comprising a vector control entity (VCE) for performing vectoring of all of the two or more lines during the normal operation portion of the TDD frame.

9. The system according to claim 8, wherein the VCE performs vectoring of only certain of the two or more lines after the normal operation portion of the TDD frame in accordance with the configuring of the first number of time slots for quiet symbols, the second number of time slots for data symbols, the third number of time slots for quiet symbols, and the fourth number of time slots for data symbols.

10. The system according to claim 7, wherein configuring further includes sending the number of time slots, the first number of time slots for quiet symbols, the second number of time slots for data symbols, the third number of time slots for quiet symbols, and the fourth number of time slots for data symbols to downstream transceivers coupled to the two or more lines.

11. The system according to claim 7, wherein the DPU transceivers and the downstream transceivers implement TDD communications according to G. fast.

12. The system according to claim 11, wherein sending the number of time slots, the first number of time slots for quiet symbols, the second number of time slots for data symbols, the third number of time slots for quiet symbols, and the fourth number of time slots for data symbols to downstream transceivers includes using a Robust Management Channel (RMC) specified by G.fast.

* * * * *